C. T. HARRIS.
BRAKE LEVER.
APPLICATION FILED JUNE 24, 1912.
1,067,732.
Patented July 15, 1913.
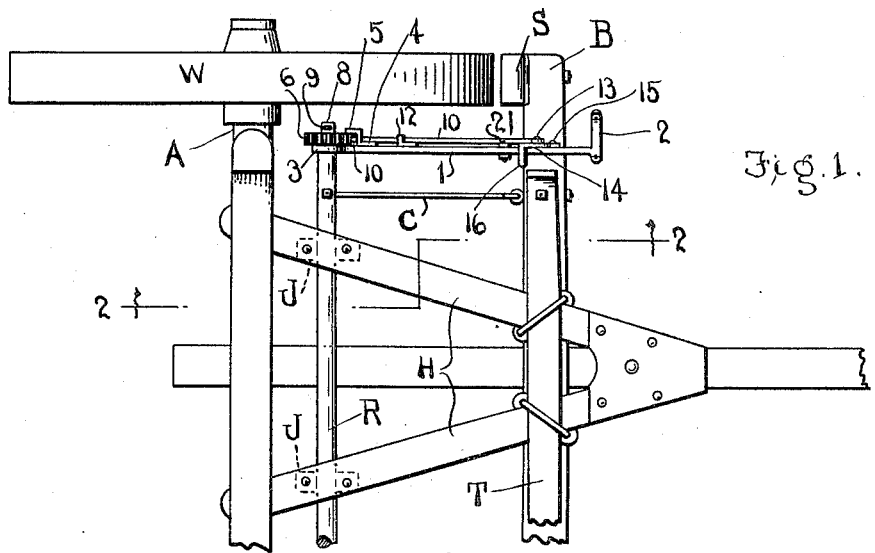
Fig. 1.
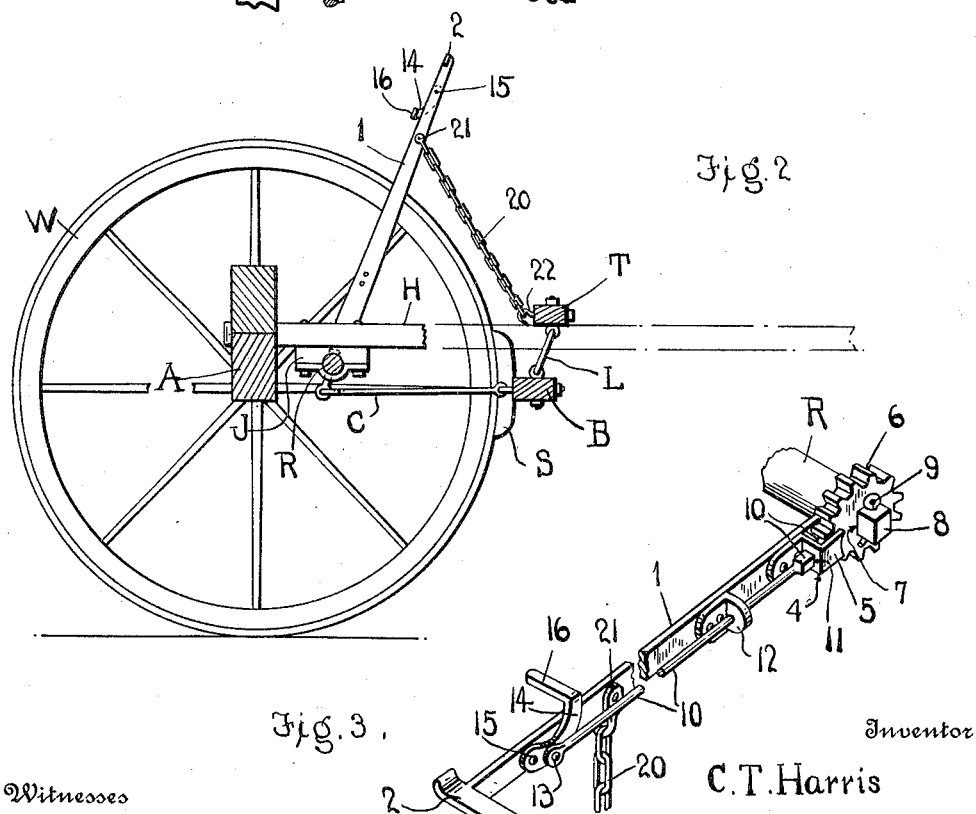
Fig. 2.
Fig. 3.
Witnesses
L. B. James
N. L. Collamer
Inventor
C. T. Harris
By H. B. Willson &co
Attorneys

UNITED STATES PATENT OFFICE.

CHARLES THOMAS HARRIS, OF STAUNTON, VIRGINIA.

BRAKE-LEVER.

1,067,732. Specification of Letters Patent. Patented July 15, 1913.

Application filed June 24, 1912. Serial No. 705,578.

*To all whom it may concern:*

Be it known that I, CHARLES THOMAS HARRIS, a citizen of the United States, residing at Staunton, in the county of Augusta and State of Virginia, have invented certain new and useful Improvements in Brake-Levers; and I do declare the following to be a full, clear, and exact description of the invention, such as will enable others skilled in the art to which it appertains to make and use the same.

This invention relates to the brakes ordinarily used on farm and road wagons, and more especially to the lever by means of which the brake is applied.

Broadly speaking, the objects of the present invention are to construct and arrange the brake lever in such manner that it will not be in the way no matter what use is being made of the wagon, it can be set without tools and instantly so that the brake can be applied with the lever in almost any position and the operator either in the wagon or standing on the ground, it can be applied to the ordinary brake mechanism now found on many farm and road wagons, and it is cheap and inexpensive. These objects and advantages with others are attained by constructing the brake lever and connecting it in the manner hereinafter more fully set forth and claimed, and shown in the drawings, wherein—

Figure 1 is a plan view of the left side of the rear portion of an ordinary farm wagon, showing the running gear and omitting the body, and with my improved brake lever applied; Fig. 2 is a vertical section on the line 2—2 of Fig. 1; Fig. 3 is an enlarged perspective detail of the brake lever and its latch mechanism, showing its gear as applied to the square end of the roller described below.

The various objects and advantages arising from the use of this improved lever are attained by its application to the brake mechanism on an ordinary farm wagon which is shown in the drawings and may be briefly described as follows:—Adjacent the rear wheels W stand the brake shoes S, each of which is mounted on one end of a beam B which is usually suspended by links L from a transverse bar T that lies across and is clipped to the rear hounds H, and the brake beam is moved to the rear to apply the shoes to the wheels by rotating a rock shaft or roller R which is mounted in eye-bolts or journals J beneath the hounds just forward of the rear axle A, and has suitable connections C with said beam such as eye-bolts projecting downward through the roller and to the rear through the beam and rods connecting the eyes thereof. Ordinarily an arm projecting from this rock-shaft or roller is connected by a rod with a brake lever pivoted near the driver's seat and which possibly moves over a toothed segment, so that the driver may apply the brakes as usual; but as this construction is well known and forms no part of the present invention, I have omitted its illustration although I mention it simply to emphasize the point that my improved brake lever can be used in conjunction with the brake mechanism and ordinary brake lever now commonly employed on farm wagons of this character.

Coming now more particularly to the details of the present invention, the numeral 1 designates the body of this improved brake lever which is ordinarily a bar about three feet in length having a foot piece 2 projecting laterally from its upper end or to the left if this lever stands at the left side of the wagon, and having an eye 3 formed at its lower end to loosely embrace the roller R. To the outer side of this lever and at a point above its eye is secured an angular bracket 4 whose lip 5 projects downward toward the roller and is spaced from the body of the lever a sufficient distance to permit a gear wheel 6 to stand between said lip and body and against what will be the outside of the latter, the wheel having a square hole 7 through its hub which is mounted on the square extremity 8 of the roller and held thereon by suitable means such as a split pin 9. In connection with the lever a second member is employed which may well be called a latch. This consists of a rod 10 whose lower end moves through a hole 11 in the bracket 4 so that its extremity 10′ may engage the teeth of the gear wheel, whose body preferably moves through a guiding eye 12 carried by the main lever 1, and whose upper end is pivotally connected at 13 with the bent arm 14 of a latch lever which in turn is pivoted at 15 to the main lever and has a hand piece 16 at its outer extremity projecting across the edge of said main lever and to the side opposite said foot piece 2, as shown. The parts are by preference entirely of metal, made in about the proportions and of about the shape illustrated in the drawings, although I reserve the right to change the same as might suit the wishes of the manufacturer or user.

When this improved brake lever is applied to the roller of a brake mechanism already having its ordinary brake lever and connection as above suggested, if latter be on the right side of the wagon my improved brake lever will by preference be on the left side and at the left end of the roller; and should the latter be of wood it is only necessary to square its extremity so that it will fit the square hole in the gear wheel as shown and bore a hole through the squared portion for the passage of the split pin or other fastening device. The gear wheel is then slipped into the space between the lip of the bracket and the body of the main lever, the eye of the latter slipped onto the extremity of the roller and the square hole in the gear onto the squared portion of the roller, and the split pin applied. When the hand piece of the latch lever is moved upward toward the foot piece on the main lever the extremity of the latch is withdrawn from engagement with the gear, and the body of the main lever is free to swing around the roller, or the latter is free to be revolved within the eye in the main lever in case the brake is applied by the ordinary brake lever not shown. When the hand piece of the latch lever is moved downward as shown in Fig. 3, not only does the pivotal point 13 pass a straight line between the pivot 15 and the roller, but the hand piece 16, because of its projection to the right, comes in contact with the upper edge of the main lever and is completely out of the way so that the foot may be put upon the foot-piece 2 to actuate the brake and in doing so there is no liability of tripping the latch-lever by accidental contact with its hand-piece 16. When not in use my improved brake lever lies forward, with its front end resting on the brake beam B so that it is entirely out of the way while yet not out of reach. When it is to be put into use, it is raised alongside the running gear if the wagon body be not in place, or alongside the body if the latter be used, and the hand piece of the latch lever moved downward so that it swings on its pivot and the pivotal connection 13 between it and the latch moves around the pivot point 15 with the result that the extremity 10′ of the latch is projected into engagement with the gear while the main lever stands in this position which is usually upright. Thereafter when it is desired to apply the brake, it is only necessary for the operator riding on the running gear or within the wagon body, to push the foot piece forward and downward, and as this improved brake lever is at this time locked to the roller, such forward and downward movement of its outer end causes the inner end to rotate the roller R forwardly, and the latter through its connection C with the brake beam B applies the shoes S to the rear wheels W. In descending a long hill, some means may be provided for holding the lever in this position, such as the chain 20 attached at one end at the point 21 to the main lever 1, and which may be engaged with some fixed part of the vehicle, such as a pin or hook 22 on the transverse bar T; and when such means are used to hold the brake lever with the brake applied, it will not be necessary for the operator to keep his foot on the foot piece. If it should so happen that this improved brake lever is to be used when the running gear of the wagon supports a large load or article such as hay or a load of logs, or when such loads are to be loaded onto or removed from the running gear and it is not desirable to have the lever stand vertical when the brakes are not applied; all that would be necessary would be to turn the roller forward as far as possible without applying the brake, then raise the lever 1 as far as possible without having its outer end or its body interfere with the load or the objects mentioned, project the latch by the means above described, and permit the parts to remain in that position until the brakes are to be applied which is accomplished by depressing the bent front end of the lever in the same manner. If it be impossible for the operator to ride on the load, the lever could be depressed by hand by an operator walking in the roadway beside the wagon and reaching upward and grasping the foot piece 2. The position to which the lever 1 must be swung in order to apply the brake, will of course depend upon the character of the connection C between the roller R and the brake beam B, but as said connection is such that the ordinary brake lever near the driver's seat need usually be moved through only about a quarter of a circle, the same degree of movement of this improved brake lever will apply the brakes, or a lesser degree if the roller be turned first as far as possible without applying the brakes and before the latch is engaged with the gear.

Many advantages arise from the use of this improved brake lever as has been set forth. Among these, I might say that it can be applied to the ordinary brake mechanism now found on a farm or road wagon, when the latter is built, or it can be applied later, as an attachment thereto; when once applied it remains in place, and need not be removed—no matter what the nature of the load or what the size and shape of the wagon body; from time to time it can be adjusted to take up wear in the faces of the brake shoes; when not in use the brake lever lies across the brake beam completely out of the way and almost out of sight; it has been shown above how the brake can be applied by turning this lever through an arc of limited length, whether the brake lever stands upright or nearly horizontal at the beginning of the movement; its use in applying or releasing the brake does not interfere with the body, be it a box-body or a hay-rack, and the brake can be applied even while the ordinary hay ladder is in use; and finally no tools are necessary to adjust the device, and the split pin can be instantly withdrawn when it is desirable to remove this lever entirely from the roller. If the arm 14 of the latch lever be bent as shown and described, in the act of turning it around the pivot point 15 the pivotal connection 13 between this arm and the latch passes a straight line extending through the pivot point 15 and the axis of the roller, so that just as the hand piece 16 comes into contact with the edge of the main lever the point of pivotal connection 13 has passed a dead center and the latch remains in position to lock the main lever to the shaft by reason of the engagement of the latch tip with the gear.

A peculiar advantage lies in the use of a wheel having gear teeth instead of ratchet teeth, in that with the gear wheel which I employ the tip of the latch may be thrown into engagement with its teeth and the main lever then drawn forcibly to the rear (and perhaps connected by the chain with the running gear or wagon body) so that in time of muddy weather this mechanism will hold the brake shoes remote from the tires of the rear wheels and thereby prevent the accumulation of mud upon them which, it is well known, offers quite an obstruction to the movement of the vehicle.

What is claimed as new is:

In a brake mechanism, the combination with a roller, a gear fast thereon, a main lever journaled at its inner end on the roller alongside said gear, and a latch slidable on said lever and whose inner end is adapted to engage the gear teeth; of a latch lever having a bent arm pivoted at one end to the main lever and provided at its other end with a laterally projecting hand piece overlying said main lever and projecting to one side thereof, the arm being pivotally connected at its bend with the outer end of the latch at a point which passes a straight line between the latch pivot and the axis of the roller when the latch lever is moved to throw its hand piece into contact with the main lever, and a foot piece at the outer extremity of the main lever projecting laterally therefrom in a direction opposite to said hand piece, for the purpose set forth.

In testimony whereof I have hereunto set my hand in presence of two subscribing witnesses.

CHARLES THOMAS HARRIS.

Witnesses:
GEORGE GIOVANNETTI,
N. L. COLLAMER.

Copies of this patent may be obtained for five cents each, by addressing the "Commissioner of Patents, Washington, D. C."